United States Patent [19]

Meyer

[11] 4,147,005

[45] Apr. 3, 1979

[54] MOLDING CLIP AND METHOD OF ASSEMBLY

[75] Inventor: Engelbert A. Meyer, Sun City, Calif.

[73] Assignee: USM Corporation, Farmington, Conn.

[21] Appl. No.: 784,454

[22] Filed: Apr. 6, 1977

Related U.S. Application Data

[63] Continuation-in-part of Ser. No. 739,844, Nov. 9, 1976, which is a continuation-in-part of Ser. No. 694,078, Jun. 9, 1976.

[51] Int. Cl.² .............................................. E04F 19/02
[52] U.S. Cl. ...................................... 52/397; 52/717; 52/718
[58] Field of Search ................................ 52/397–401, 52/717, 718; 24/73

[56] References Cited

U.S. PATENT DOCUMENTS

| 3,455,080 | 7/1969 | Meadows | 52/716 |
| 3,851,433 | 12/1974 | Colucci | 52/401 |
| 3,968,613 | 7/1976 | Meyer | 52/717 |

Primary Examiner—James L. Ridgill, Jr.
Attorney, Agent, or Firm—Aubrey C. Brine; Richard B. Megley; Vincent A. White

[57] ABSTRACT

A resilient fastener or adapter and method is provided for attaching a flanged molding member, or the like, to a panel to substantially cover a gap between the panel and a spaced structural member. The fastener or adapter is flexurally insertable in the space between the panel surface and the structured member and is retained therebetween in the flexed state. A resilient tab extends adjacent a surface of the panel to receive a flange of the molding in interference engagement therewith and retain the molding in place. The fastener or adapter is advantageously employed in the manufacture of an automobile to retain a decorative molding in the space formed between a windshield or backlight and the body panel to which the windshield or backlight is assembled.

6 Claims, 14 Drawing Figures

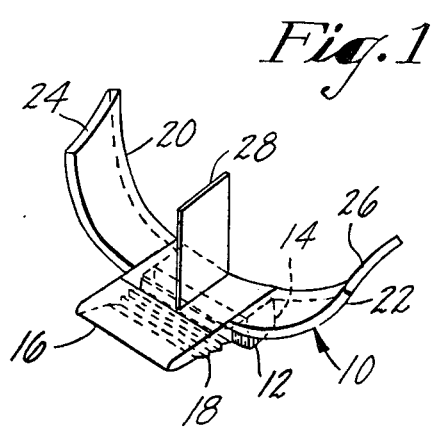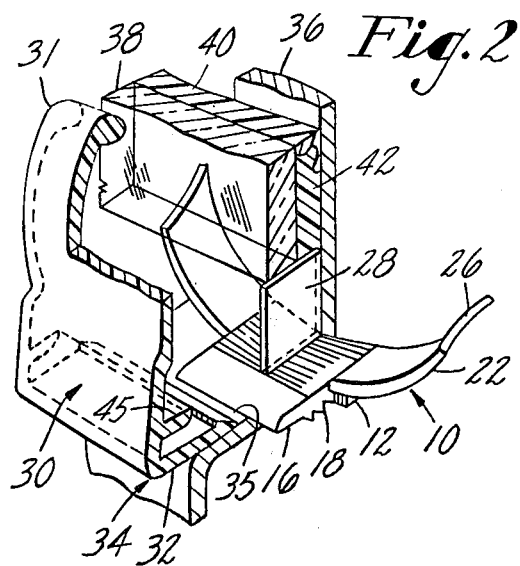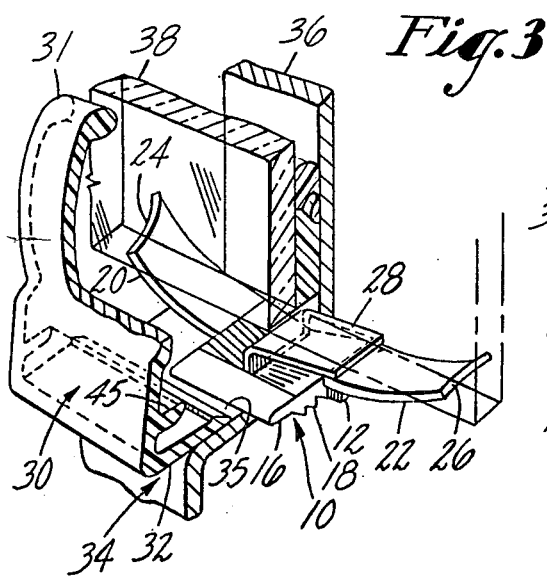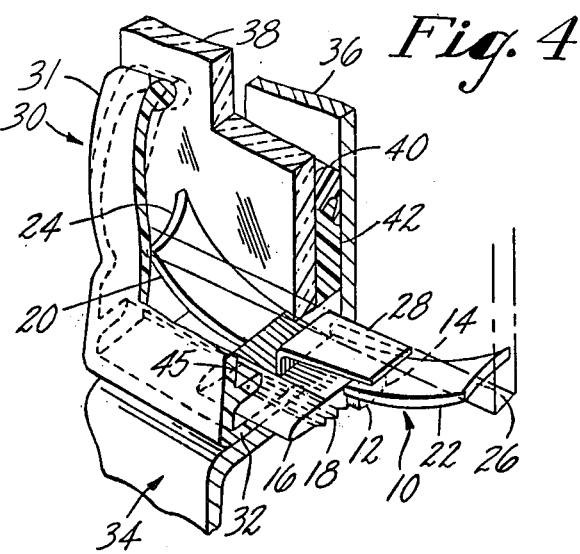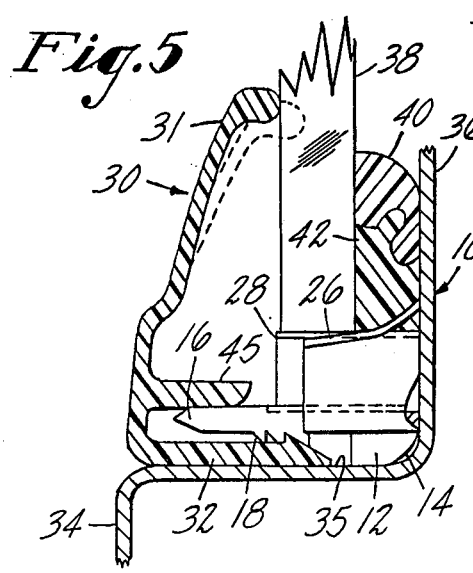

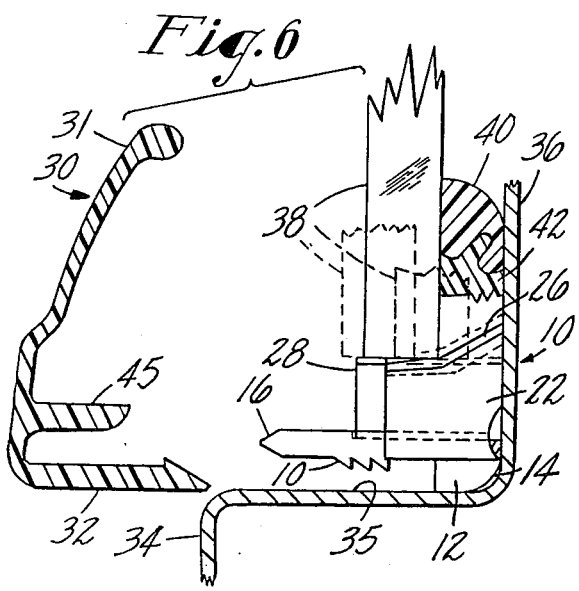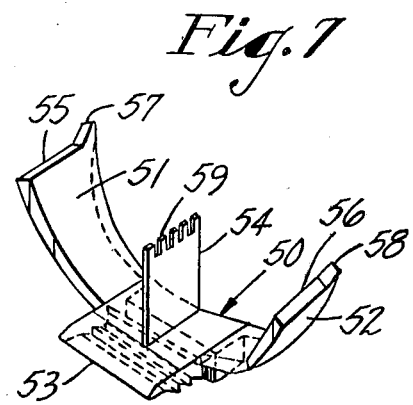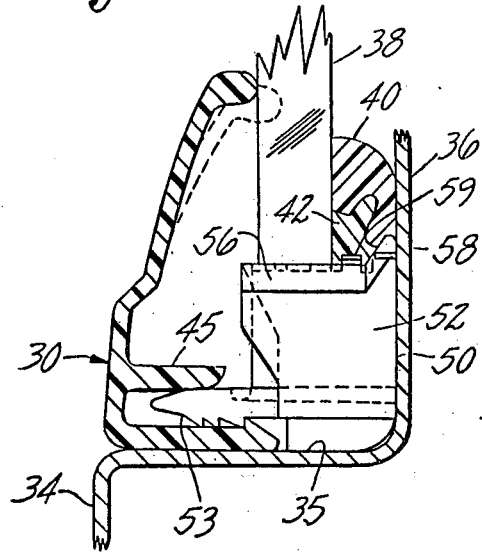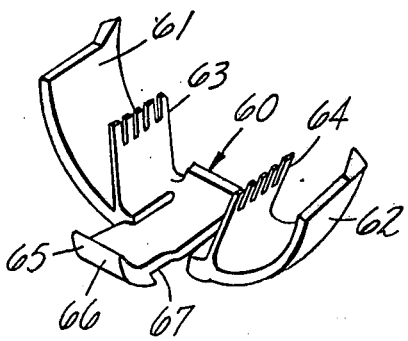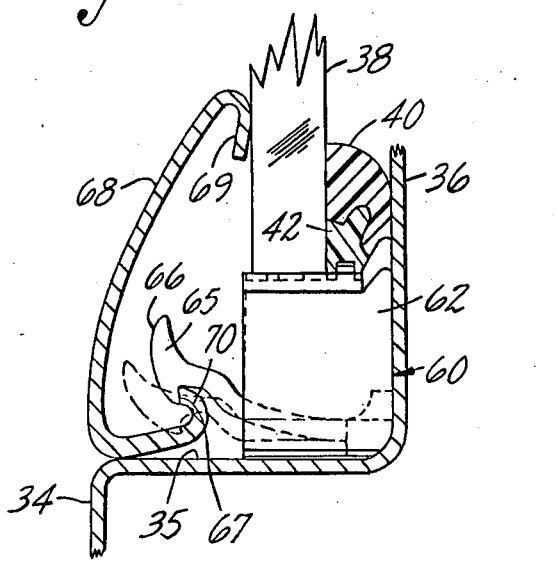

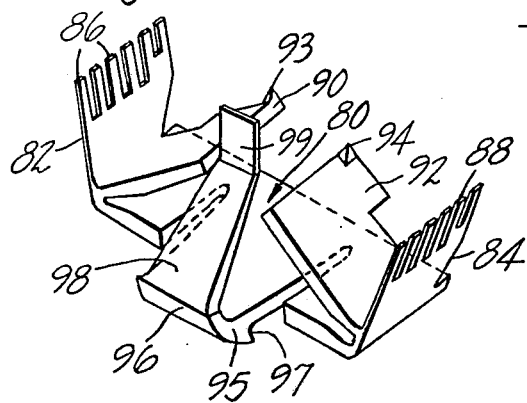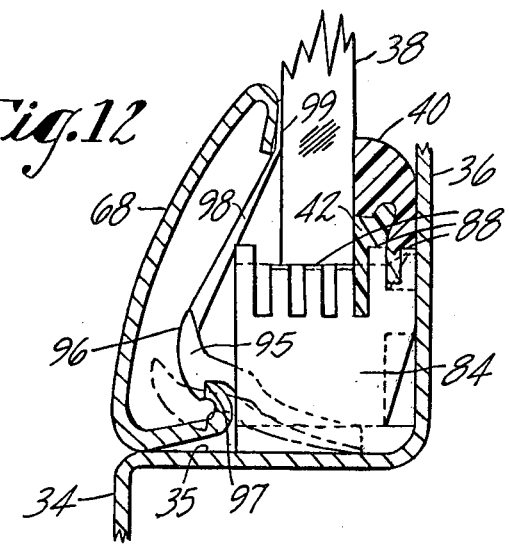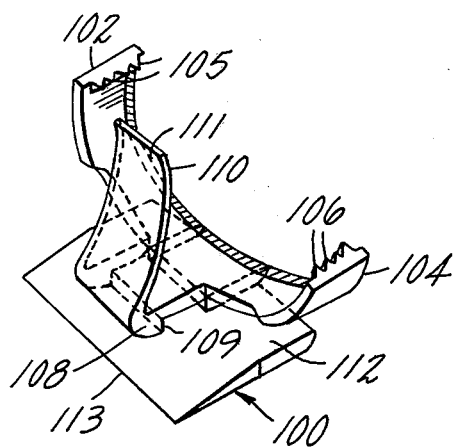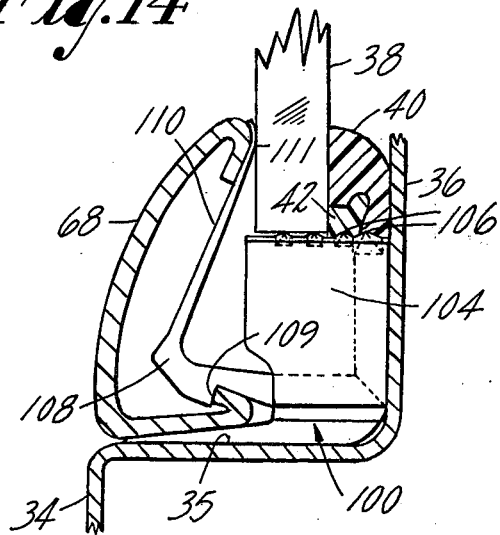

4,147,005

MOLDING CLIP AND METHOD OF ASSEMBLY

CROSS-REFERENCE TO RELATED APPLICATIONS

This application is a continuation-in-part of my prior application Ser. No. 739,844 filed Nov. 9, 1976 which is a continuation-in-part of application Ser. No. 694,078 filed June 9, 1976.

BACKGROUND OF THE INVENTION

The present invention relates to a fastener or adapter for attaching a resilient molding member or the like to a panel surface, and more particularly, to a fastener and method for attaching a molding member to an automobile body to bridge the gap between a windshield or backlight glass, and a panel adjacent the body opening.

In the assembly of an automobile body, it is common practice to set the windshield or backlight glass within a rubber-like gasket engaging the marginal edges of the glass, the gasket being cemented or otherwise attached to the glass and edges of the body panel adjacent the opening provided for the glass. In so attaching the glass to the body panel, there is a marginal gap produced between the body panel and the glass which is generally of varying dimensions due to mass production techniques, and would therefore be considered unsightly if left to view in the final construction.

This opening is generally covered by a resilient molding of sheet metal or other composition, which is attached to the body and positioned to bridge the gap between the body panel and the windshield, or backlight structure.

Various techniques have been employed to attach this molding such that it will be firmly in contact with the body panel and the windshield or backlight, and will remain so during the life of the automobile. One such method is to provide a plurality of fasteners which are retained on button-headed studs attached to the body panel. This type of construction is shown generally in U.S. Pat. Nos. 3,740,800 and 3,807,964 assigned to the assignee of the present invention.

While these prior art devices have proved satisfactory in achieving their desired result, a need has arisen to provide a suitable fastener which does not require the assembly of button-headed studs to the panel, but still will function to retain the molding in resilient engagement contacting the glass and the body panel.

The present invention, therefore, has as an object, to provide a fastener or adapter for attaching a molding member, or the like, in the gap between the glass and the body panel in an automobile structure, which device is easy to manufacture, simple in construction and facilitates assembly of the molding member onto the panel.

It is a further object of the invention to provide a fastener or adapter of the type described which does not require the addition of button-headed studs, screws, bolts or other fasteners to affix it to the automobile body panel.

Another object of the invention is to provide a method of attaching a windshield or backlight structure to an opening in a vehicle which is more simple to perform and does not require the addition of button-headed studs, screws, bolts or other fasteners to affix the structure to the automobile body panel.

SUMMARY OF THE INVENTION

The above objects of the invention, and further objects which will be apparent as the description proceeds, are achieved by providing a fastener or adapter for attaching a resilient flanged molding member, or the like, to a panel surface and a structural member spaced therefrom, which comprises a body portion having a bottom surface contacting the panel surface and a resilient tab extending outwardly from the body portion. The resilient tab is provided with a lower surface for engaging a flange of the molding member and a pair of arcuate shaped resilient wings extend upwardly at an angle from the sides of the body portion to contact the bottom surface of the structural member. The fastener or adapter is retained between the panel surface and the structural member with the wings in the flexed state contacting the member, and the molding member is retained on the panel surface by a flange thereof being engaged with the bottom surface of the tab, with the tab in the flexed state.

The fastener or adapter is advantageously manufactured in the form of a resilient plastic one piece member as by injection molding or other form of plastic fabrication, resulting in a unitary structure.

BRIEF DESCRIPTION OF THE DRAWING

The foregoing and other features of the invention will be more particularly described in connection with the preferred embodiments, and with reference to the accompanying drawing wherein;

FIG. 1 is a top perspective view showing a fastener or adapter embodying features of the present invention;

FIGS. 2, 3 and 4 are top perspective views, partially in section, showing the fastener of FIG. 1 installed in the gap between a glass structure and an automobile body panel;

FIG. 5 is a side elevational view partially in section showing the fastener of FIG. 5 disposed in the completed assembly;

FIG. 6 is a side elevational view showing in phantom lines various relative locations of elements of FIGS. 2 through 5;

FIG. 7 is a top perspective view similar to FIG. 1, showing an alternate embodiment of the invention;

FIG. 8 is a side elevational view partially in section, similar to FIG. 5 employing the embodiment of FIG. 7;

FIG. 9 is a top perspective view similar to FIG. 1, showing another alternate embodiment of the invention;

FIG. 10 is a side elevational view, partially in section, similar to FIG. 5 employing the embodiment of FIG. 9;

FIG. 11 is a top perspective view similar to FIG. 1, showing a further alternate embodiment of the invention;

FIG. 12 is a side elevational view, partially in section, similar to FIG. 5, employing the embodiment of FIG. 11;

FIG. 13 is a top perspective view showing another alternate embodiment of the invention; and FIG. 14 is a side elevational view partially in section, and similar to FIG. 5, employing the embodiment of FIG. 13.

DESCRIPTION OF THE PREFERRED EMBODIMENTS

Referring now to the drawing, and in particular FIG. 1, there is shown a fastener or adapter 10 which is molded from a plastic material such as Celcon (Acetal) M-90, a trademark of Celanese Corporation. However, it is understood that the adapter 10 may be manufactured of any suitable material which will provide a flexural quality to those elements described as resilient, in the following description.

As noted in FIG. 1, the adapter 10 comprises a body portion 12 of substantially rectangular configuration having a curved surface 14 formed at the rear thereof. A resilient tab 16 of substantially the same width as the body member 12 extends forwardly from the body member. The tab 16 is provided with surface engaging means of the bottom surface thereof, in the form of a plurality of laterally extending teeth 18, for gripping an adjacent structure.

At either side of the body member 12 is provided an arcuate shaped resilient wing 20,22, each being directed outwardly and upwardly from the body member 12. Each of the wings 20,22, at its outer extremity is provided with a substantially arcuate, or curved wedge-shaped surface, 24,26, which is substantially higher at the rear of the fastener than at the front of the fastener.

In the embodiment shown, a resilient stabilizing fin 28 of substantially the same width as the wings 20,22, extends upwardly from the body member 12. The fin 28 has a linear surface which is generally parallel to the upper surface of the body member 12, as best shown in FIG. 1.

Referring now to FIGS. 2 through 5, in employing the fastener 10 in a typical automobile construction, the fastener 10 is utilized to retain a decorative molding 30 having opposed flanges 31 and 32 onto an automobile panel 34. The body panel 34 includes an "L" shaped recess provided by a surface 35 adjacent a flange 36, called a pinch weld, which forms the marginal edge of the windshield or backlight opening, in the automobile body. In the structure shown, a backlight window glass structure 38 is attached to the flange 36 by means of a rubber gasket 40 having a surface cemented to the glass structure and an opposite surface cemented to the flange 36.

In assembling the glass structure 38 to the automobile body, the glass structure and gasket 40 are affixed to the flange 36, and a caulking or sealing compound 42 is applied to the inner surface of the glass structure 38, adjacent the gasket 40. The compound 42 is wiped level with the bottom surface of the structure 38, as shown in FIGS. 2 through 5. The sealing compound 42 employed may be any suitable compound well known in the art used for this purpose, such as a urethane compound, and is generally of a type that remains flexible or tacky for several hours after application, before setting up.

As will be noted in comparing FIGS. 2 and 3, due to the tolerance variation in the glass structure 38 and the opening defined by the surface 35, and taking into consideration the mass production practices employed in assembly of these elements, the gap between the bottom edge of the glass structure 38 and the surface 35 may vary. In FIG. 2, the gap is much wider than that shown in FIG. 3, and may vary around the perimeter of the glass structure 38.

As shown in FIGS. 2 and 3, with the glass structure 38 affixed to the panel 34, a plurality of the fasteners 10 are inserted between the surface 35 and the bottom of the glass structure 38. With the large gap shown in FIG. 2, the fastener 10 is inserted with very little flexure taking place in the wings 20 and 22. However, on each of the wings 20 and 22, the curved wedge-shaped surface 24 and 26 respectively, are flexed to contact the bottom edge of the glass structure 38 and the distal pointed end of each of the wings 22 and 20 becomes embedded in the soft caulking, or sealing compound 42. Thus, the fastener 10 is substantially wedged in place with its back surface adjacent the flange 36 and the lower surface of the body portion 12 contacting the surface 35 due to the arcuate wedge-shaped surfaces 24 and 26 making contact at some point on their surface with the bottom of the glass structure 38.

As shown in FIGS. 4 and 5, in the final step of construction, the decorative molding 30 is forced into position by inserting the flange 32 between the tab 16 of the fastener 10 and the surface 35 of the body panel. In the embodiment shown, the molding 30 also is provided with a stabilizing flange 45.

Due to the plurality of teeth provided on the lower surface of the tab 18, the decorative molding may be forced toward the glass structure 38 until the flange 31 is in resilient contact with the surface of the glass. It should here be observed, that with the construction shown in FIG. 5, the wedge-shaped surfaces 24 and 26 which contact the bottom surface of the glass 38 allow for a minimum amount of rolling, or movement of the fastener 10 when the molding flange 32 is inserted between the tab 16 and the panel surface 35. The stabilizing flange 45 further aids to prevent rolling of the fastener 10 by its clamping action with the flange 32. This allows for the resilient flexing of the tab 16 with a resultant clamping force being exerted between the tab and the body panel surface 35.

Additionally, with the stabilizing fin 28 disposed between the body portion 12 of the fastener 10, and the bottom surface of the glass structure 38, an additional stabilizing force is provided, overcoming the tendency of the fastener to roll.

With reference now to FIG. 6, there is yet another variation in the fabrication of the glass structure to the body panel 34 which occurs. This variation is known in the trade as "high glass" or "low glass". The glass is considered to be "high glass" when it is a distance from the flange 36 as shown by the outermost phantom lines in FIG. 6, that is when there is a relatively large gap between the glass structure 38 and the flange 36.

In contrast the "low glass" condition occurs when there is only a small gap between the glass structure 38 and the flange 36 as shown by the innermost phanton lines of FIG. 6.

As is evident in viewing FIG. 6, the structure provided in the present invention is capable not only of providing a fastener to accommodate the differences in spacing between the glass structure 38 and the surface 35, but is also capable of forming itself to provide the same firm attachment whether the glass is in the "high" or "low" condition. Thus, with the glass in the "low" position, the bottom surface, or corner of the glass structure 38, rides high on the wedge-shaped surface 24 or 26, and with the high glass configuration the glass rides lower on these surfaces, but the wedging action still takes place.

As an alternative to the fastener 10, and in keeping with the teachings of the present invention, FIGS. 7 through 10 show further embodiments of a resilient fastener or adapter, for attaching a flanged molding member to a panel which also serve to accomplish the objectives of the present invention.

In FIGS. 7 and 8 is shown an alternate form of fastener 50 having a pair of wings 51 and 52 similar to those of the construction of the fastener 10. The fastener 50 also includes a resilient tab 53 of substantially the same configuration as the fastener 10. The fastener 50 further includes a centrally located fin 54 similar to the fin 28 of the fastener 10.

The primary difference between the fastener 50 and the fastener 10 resides in the construction of those portions of the wings 50 and 52 and the fin 54 which contact the glass structure 38. The end surfaces of the wings 51 and 52, rather than being arcuate, comprise a first surface 55 or 56 running transverse to the wing 51 or 52 at substantially a right angle, and a ramp surface 57 or 58 angularly disposed to the surface 55 or 56, respectively.

As shown in FIG. 8, the fastener 50 is assembled in all respects in the same manner as was the fastener 10. Also, as with the fastener 10, the wings 51 and 52 project upwardly from adjacent the surface 35 to contact the glass structure 38 and in the present instance, the surface 57 or 58 serve to project into the sealing compound 42 to firmly hold the fastener in place.

The fin 54 at the portion contacting the glass structure 38 is provided with a plurality of rectangular spaced locking fingers 59. As best shown in FIG. 8, depending on whether there is a "high glass" or "low glass" as described above, one or more of the locking fingers 59 will flex into a position behind the glass 38 and into the sealing compound 42 thus retaining the fastener 50 behind the glass structure 38, and inhibiting forward rocking motion of the fastener.

Referring now to FIGS. 9 and 10, and particularly FIG. 9, there is shown a fastener 60 having portions providing wings 61 and 62 identical to those of the fastener 50. The difference in detailed construction between the fastener 60 and the fastener 55 resides in the employment of two fins 63 and 64 symmetrically spaced above the center line of the fastener 60. The fins 63 and 64 function to stabilize the fastener 60 as does the fin 54, and each is constructed identical to the fin 54 as will be observed by comparison of FIGS. 7 and 9. Additionally, the resilient tab 53 of the fastener 50, or the tab 16 of the fastener 10 is replaced by a tab 65 of different construction than the fastener 60. The tab 65 is provided with an outer curved surface 66 and a laterally extending notch 67.

Referring now to FIG. 10, the fastener 50 is shown to be advantageously employed in retaining a trim molding 68 adjacent the glass structure 38. The trim molding 68 is similar to that shown in the aforementioned U.S. Pat. Nos. 3,740,800 and 3,807,964 and is fabricated of sheet metal to form a U-shaped structure having flanges 69 and 70 at either edge of the molding. The fastener 60 is retained between the glass structure 38 and the surface 35 in the manner described with reference to the fastener 50. In this embodiment, however, each of the fins 63 and 64 are flexed between the glass structure 38 and the surface 35 with locking fingers extending behind the glass structure 38 in a similar fashion to the fin 54. Prior to the molding 68 being applied to the structure, the tab 65 is positioned as shown in the dot dash lines of FIG. 10. The molding 68 is snapped beneath the tab 65 which flexes to retain the molding between the tab and the surface 35. The notch 67 prevents outward movement of the molding 68 which is retained in contact with the glass structure 38.

Referring now to FIGS. 11 and 12, reference will be made to yet another embodiment of the invention. As observed in FIG. 11, an adapter 80 is shown to have a body portion provided with a pair of resilient wings, 82 and 84, extending upwardly from the body portion and angled slightly outwardly from the body portion. Each of the wings 82 and 84, is provided at its free end with a plurality of locking fingers, 86 and 88, extending in the plane of the respective wing, 82 or 84.

A pair of elongated resilient fins 90, 92, extend upwardly from the upper surface of the body portion to a point adjacent the center of the adapter 80. Each of the fins 90 and 92, extend from a point on the body portion adjacent a respective wing, 82 or 84, and are directed toward one another, to provide free surfaces adjacent the center of the adapter 80. The fins 90 and 92, each are provided with a respective prong, 93, 94, adjacent the free end thereof, and formed at the rear corner of the outer surface of each fin.

At the forward side of the adapter 80, there is provided a tab 95 similar in construction to the tab 65 shown in the embodiment of FIGS. 9 and 10. As with the tab 65, the tab 95 is formed in part by a pair of slots extending into the body of the adapter 80 to provide for a greater flexibility of the tab when in the operative position. The tab 95 is provided with a curved surface 96 and a laterally extending notch 97.

Unlike the tab 65, however, the tab 95 further has the feature of a resilient spacer arm 98 which extends rearwardly and upwardly from the tab 95 and terminates in a relatively thin end portion 99. The end portion 99 of the spacer arm 98 is disposed substantially normal to the upper surface of the body portion of the adapter 80 and may extend to at least the height of the resilient wings, 82 and 84, in their unflexed state.

In employing the adapter 80 in a windshield or backlight assembly as previously provided in FIGS. 1 through 10, references should be had to FIG. 12 wherein like elements shown in FIGS. 1 through 10 have been given like reference numerals. As shown in FIG. 12, the assembly is formed in the same steps as previously recited, but with the adapters 80 retained between the glass structure 38 and the surface 35. In the present embodiment, however, each of the wings 82 and 84, are flexed outwardly with the locking fingers 86 and 88, tending to snap into locking engagement behind the glass structure 38 as they are introduced behind the glass structure, in similar manner to the fins of the previous embodiment. In the present embodiment, the fins, 90 and 92, are forced inwardly and downwardly, however, with the prongs, 93 and 94, also snapping behind the glass structure 38 to provide stability for the fastener. With the plurality of the adapters 80 fixed in stabilized relation between the surface 35 and the glass structure 38, a metallic molding 68, similar to that described in FIGS. 9 and 10, is snapped into position, as shown in FIG. 12.

It will be noted that the resilient spacer arm 98 is fashioned to extend to a position wherein the end portion 99 is disposed between the edge of the molding 68 and the glass structure. This accomplishes two purposes, in that the spacer prevents any objectionable noise which would occur should the metal of the molding 68 rub against the glass structure 38, and additionally, a space is provided between the molding 68 and the glass for circulation of air therethrough, to carry off moisture which may collect in the molding during use of the structure.

In FIGS. 13 and 14 there is shown yet another embodiment of the subject invention which is similar to the structure shown in FIGS. 1 through 5. In FIG. 13, adapter 100 is formed having a body portion with a pair of resilient wings 102 and 104 extending upwardly from the body portion and having a plurality of locking elements in the form of teeth 105 and 106 extending inwardly and outwardly, towards one another, at the remote ends of a respective wing. The teeth 105 and 106 may be of equal dimension in height and width, or the innermost tooth provided in each group may be of larger height as shown in FIG. 13.

Extending from the body portion of the adapter 100 is a tab 108 having one end fixed at the base of the wings 102 and 104 and its free end spaced outwardly from the body portion. The free end of the flexible tab 108 is provided with a notch 109 at its underside, and a relatively thin flexible spacer arm 110 extends upwardly from the upper side of the tab. At the free end of the spacer arm 10, a radial end portion 111 is formed.

A pedestal portion 112 is provided at the lowermost portion of the body of the adapter 100 which portion extends outwardly beyond the flexible tab 108 and as shown in FIG. 13, extends from side to side of the adapter a distance equal to that of its length dimension, and is substantially symmetrical about the center line of the adapter. The pedestal portion 112 is formed with a taper from the body portion of the adapter 100 to provide a relatively thin edge 113 at its outermost extension.

Referring now to FIG. 14, the adapter 100 is assembled similar to those alternate embodiments previously described. With the glass structure 38 positioned as shown, a gap is produced between the edge of the glass structure and the surface 35. A plurality of adapters 100 are then forced between the edge of the glass structure 38 and the panel 35 causing the wings 102 and 104 to be resiliently depressed and one or more of the teeth 105,106 extend behind the glass structure 38 and are imbedded in the sealing compound 42. The bottom surface of the pedestal portion 112 is substantially mated with the surface 35 and the resilient spacer arm 100 is flexed to firmly contact the outer surface of the glass structure 38.

A metal molding 68, similar to that of FIGS. 11 and 12, is now inserted with the bottom flange being snapped beneath the tab 108 and the sloping surface of the pedestal portion 112. The tab 108 is caused to flex upwardly and the molding 68 is retained in place due to contact of the rolled edge of the molding with the notch 109 in the tab. The upper portion of the molding 68 is received by the end portion 111 of the arm 110 and is held adjacent the outer surface of the glass, but isolated therefrom by the arcuate end portion 111 of the arm 110.

The present adapter 100 has the same versatility and features as those embodiments previously disclosed in that the location of the glass structure 38 relative to either the flange 36 or the surface 35 is not a determining factor to the effectiveness of the fastener, within practical limits. Both "high" and "low" conditions of glass as previously described, as well as variations in spacing of glass from surface 35 are accommodated.

From the foregoing, therefore, it should be evident that the present invention provides a versatile fastener or adapter for accomplishing the objectives of the inventions, and that its application is adaptable to a plurality of combinations of structure, while still maintaining its integrity in the attachment of a trim strip to the body panel.

Further, by assembling the adapters to the structure after the glass structure is in place, the assembly process is made easier than in those assemblies where the adapters are attached to either the glass structure or the panel structure, prior to the two structures being assembled.

Having thus described my invention what I claim as new and desire to secure by Letters Patent of the United States is:

1. A fastener or adapter for attaching a flanged molding member or the like to a panel surface, wherein the molding bridges the gap between the panel and a structural member spaced therefrom, having front and back surfaces substantially comprising:
   - a body portion having a bottom surface contacting said panel surface;
   - a resilient tab extending forwardly outwardly from the body portion and having means disposed on the bottom surface thereof for engaging a flange of the molding member;
   - a pair of resilient wings extending upwardly from the sides of said body portion to contact the bottom surface of said structural member, and a plurality of locking elements formed on each of said wings and extending from each of said wings for projecting upwardly adjacent the back surface of said structural member with said fastener located at a plurality of positions relative to the front and back surface of the structural member for resisting forward movement of said fastener, whereby said fastener or adapter is retained between said panel surface and said structural member with said wings in the flexed state contacting said structural member.

2. A fastener or adapter as set forth in claim 1 which is a one piece structure formed of resilient plastic material.

3. A fastener or adapter as set forth in claim 1 which is substantially symmetrical about a transverse center line through said body portion.

4. A fastener or adapter as set forth in claim 1 wherein said means for engaging the flange of said molding member comprises a laterally extending notch formed on the bottom side of said flange.

5. A fastener or adapter as set forth in claim 1 which further includes a substantially thin resilient spacer arm having its lower end attached to the upper surface of said tab and extending upwardly therefrom whereby the free end of said spacer arm is disposed between said molding member and said structural member when said adapter is retained between said panel surface and said structural member and a flange of said molding member is retained between the bottom surface of said tab and said panel surface.

6. A fastener or adapter as set forth in claim 5 wherein said spacer arm extends from said adapter body portion to at least the height of said resilient wings in the unflexed state.

* * * * *